May 24, 1960  A. M. MAYO ET AL  2,937,831
BAROMETRIC AND TIME DELAY PARACHUTE RELEASE
Filed Jan. 10, 1956  2 Sheets-Sheet 2

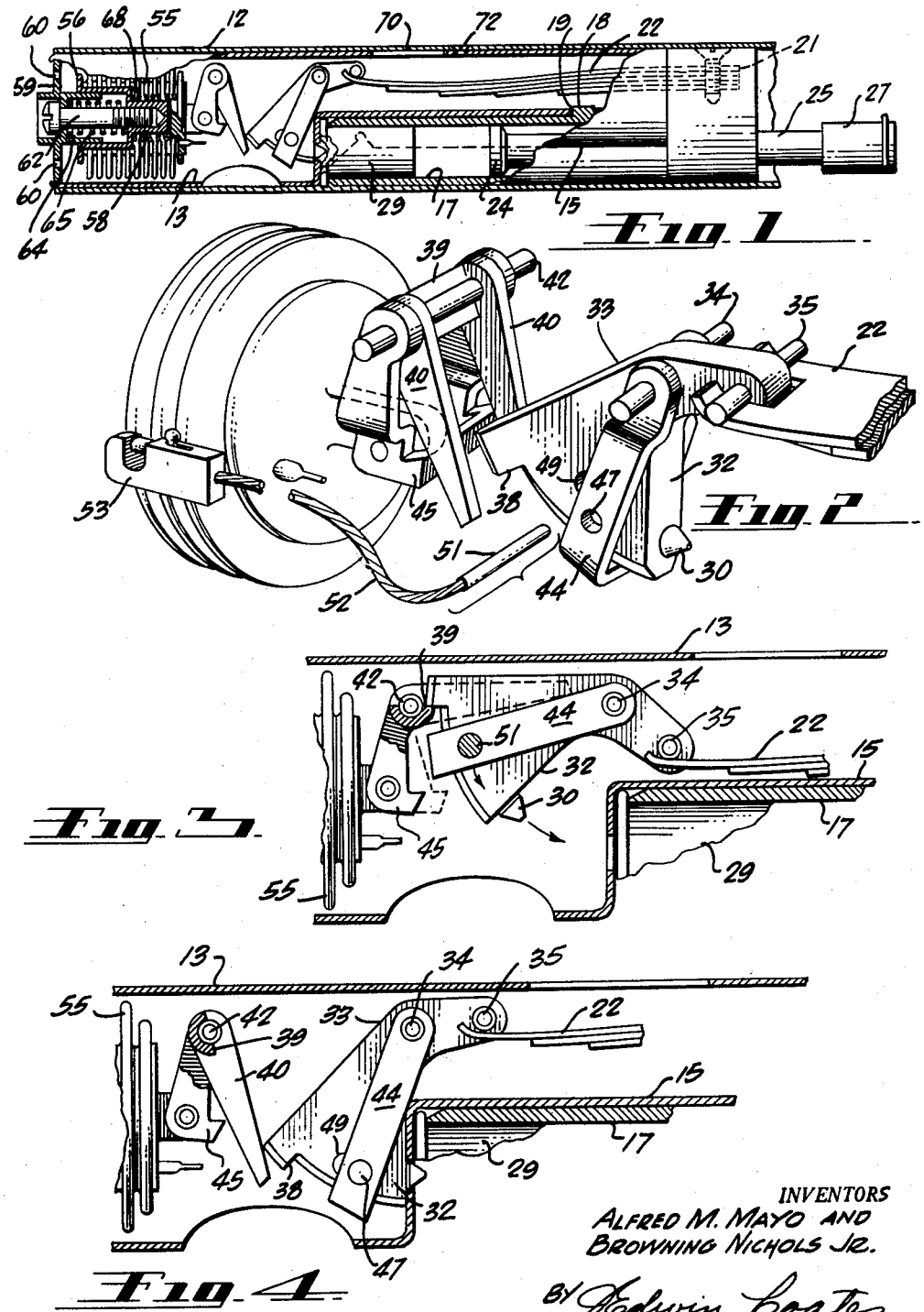

INVENTORS
ALFRED M. MAYO AND
BROWNING NICHOLS JR.

BY Edwin Coates
ATTORNEY

United States Patent Office 2,937,831
Patented May 24, 1960

2,937,831

BAROMETRIC AND TIME DELAY PARACHUTE RELEASE

Alfred M. Mayo, Palos Verdes Estates, and Browning Nichols, Jr., Culver City, Calif., assignors to Douglas Aircraft Company, Inc., Santa Monica, Calif.

Filed Jan. 10, 1956, Ser. No. 558,327

9 Claims. (Cl. 244—149)

This invention relates to a device for automatically releasing a parachute after descent to a selected altitude and/or after a delay of a fixed period of time.

In present day occurrences there are critical circumstances wherein it can normally be expected that a person evacuating or abandoning an aircraft will be unable to effect the timely opening of a parachute. Briefly, these circumstances are encountered on leaving the craft at high altitude at which the rarefied air can cause unconsciousness and by forceful ejection resulting in "blackout" or "redout" depending on the direction of ejection. Additionally, at any altitude injury sustained when leaving the aircraft or combat injury sustained before leaving the aircraft can prevent a person from manually opening the parachute.

It is the prime purpose of this invention to provide a means of eliminating the necessity of a pilot or other person to perform any manual operation to effect the release of a parachute from its pack.

The end component of the instant invention is a barrel housing a pneumatically operated piston having a travel of approximately three to five inches. The piston directly operates a rod attached to the parachute rip cord and upon actuation thereof effects release of the parachute. Immediately adjacent the piston barrel is a chamber in which a cartridge, preferably of the delay-type, is positioned for supplying the actuating medium to the piston. The discharge of the cartridge is accomplished by the striking of the primer thereof by a swinging firing hammer. By the employment of a delay type cartridge it is of course apparent that there will be an interval of time, dependent on the internal arrangement and quantities of slow and fast burning powders constituting the cartridge charge, between the striking of the primer and the discharge of gas to the piston. The desirability of this delay will become apparent hereinafter.

The firing hammer is biased toward primer striking position by spring means, herein shown as a leaf spring. A series of links and detents normally maintains the hammer in cocked position and the release of the hammer is ultimately effected by the retraction of a sear. The sear in turn is moved upon the compression of an aneroid, provided with adjusting means, whereby operation of the release device is placed under control of atmospheric pressure at any desired altitude. An overriding control in the form of a removable safety pin is incorporated in the linkage to prevent inadvertent release of the parachute when below the selected release altitude. This safety pin can be removed manually or, when it is desired to render the device fully automatic, can be attached to the pilot seat or to the airframe so that when the pilot is separated from the seat or aircraft the pin will be withdrawn.

The device of this invention is therefore well suited for high or low altitude bailout. When jumping from high altitude the safety pin will be immediately removed but the sear will not release until after descent to an appropriate preselected altitude at which the air which is more dense will contain an adequate quantity of oxygen, the dense air causing collapse of the evacuated bellows. In the event of a low altitude bailout while the bellows would already be compressed to sear release position and the safety pin immediately removed, the time delay, inherent in the cartridge construction, would cause a momentary hesitation in the actuation of the gas operated piston. In this manner the pilot is assured of time to decelerate and to clear the plane. While the time delay is sufficient for the two aforesaid purposes it is not intended that it be of a duration great enough to allow appreciable free fall or descent of the pilot.

The presently preferred embodiments of the barometric and time delay release device of this invention will be more fully understood when the following description is taken in conjunction with the accompanying drawings in which:

Figure 1 is a side elevation view, essentially in section of one embodiment of the parachute release device;

Figure 2 is a fragmentary perspective view of the cartridge firing mechanism of the device of Figure 1;

Figures 3 and 4 are side sectional views of the mechanism of Figure 2, respectively showing the cocked and released positions of the linkage and hammer;

Figure 5:
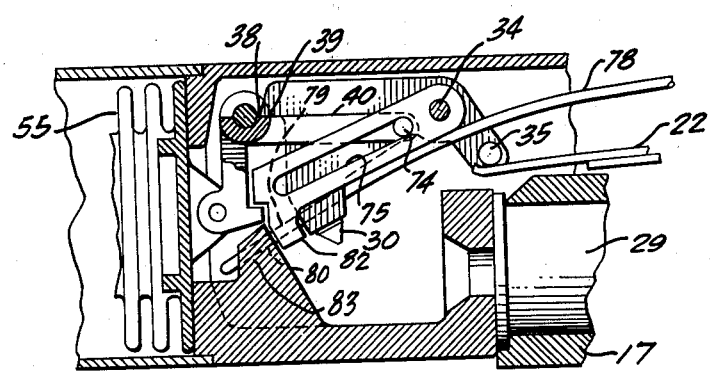
Figure 5 is a side sectional view of a modified form of cartridge firing mechanism, here shown in the latched or cocked position.

Referring now to the drawing, particularly Figures 1–4, reference numeral 12 indicates a cylindrical main housing which completely encloses the components of the operating mechanism of the present device and also serves to maintain certain of the parts in their proper assembled relation. Snugly encompassed within housing 12 is a generally circular elongated chassis or receiver 13, most conveniently formed of sheet metal, having a trough 15 impressed longitudinally at one end thereof. Within trough 15 there is nested a combined barrel and cylinder 17. As a means to prevent relative longitudinal motion between trough 15 and barrel 17, a projection 18 extends laterally from barrel 17 into interlocking engagement with complementary slot 19 in trough 15. On the right extremity (as viewed in Figure 1) of barrel 17 is a circular mounting block 21 for rigidly anchoring one end of cantilever leaf spring 22.

Internally of barrel 17 is a reciprocable gas operated piston 24 to which is affixed one end of piston rod 25. The other end of rod 25 carries an attaching member 27 which is adapted to be connected to the ripcord (not shown) of a parachute. The throw of the piston is, in practice, of the order of three to five inches which is adequate to effect release of the parachute when the ripcord is pulled.

The source of fluid pressure, as presently preferred, is a cartridge 29 employing a primer of the delay type wherein the delay between the impact to which the primer is subjected and the ignition of the cartridge charge is approximately four seconds. The cartridge 29 is inserted in the open end of barrel 17 and the gas pressure created upon discharge acts directly against piston 24 to forcibly move it and rod 25 to the right as viewed in Figure 1.

The firing of the cartridge 29 is effected by the impact of a firing pin 30 thereagainst. The firing pin 30 is carried by a hammer 32 which forms one arm of bellcrank 33 pivoted about transverse pin 34. As best shown in Figure 2 the end of leaf spring 22 is bifurcated and straddles the end of the other arm of bellcrank 33. The force of the spring 22 is transmitted to bellcrank 33 through pin 35 to normally urge firing pin 30 against the cap of cartridge 29. To enable the hammer 32 to be held in cocked position, a finger 3 protruding from the heel end of hammer 32 is provided. This finger 38 is adapted to rest upon dog 39 which oscillates in response to pivotal motion of stirrup arms 40, 40 about cross-pin 42. Viewing Figure 2, it will be seen that arms 40, 40 are retained in upward or horizontal position by a force applied to the ends thereof through yoke 44 pivoting about transverse pin 34. Claw 45 swinging about cross pin 42 constitutes a sear adapted to engage under the bight of yoke 44 and when in the position indicated in broken lines in Figure 3, through the interaction of dog 39, stirrup arms 40, 40, and yoke 44, will hold the hammer 32 and associated firing pin 30 in ready or cocked condition. It will thus be seen that a very high mechanical advantage is provided in a very small space with the result that the load on claw 45 is relatively low and the force required to slide is out from under yoke 44 is correspondingly low.

As a second means to maintain hammer 32 in cocked position in alignment in the arms of yoke 44 are pin openings 47 which are in turn in alignment with pin opening 49 through hammer 32 when the various linkages are in the position shown in Figure 3. Through the aligned openings 47 and 49 a safety pin 51 is thrust to thereby prevent movement of the hammer 32 regardless of the position of claw or sear 45. It is to be noted that, when latched by safety pin 51, the bight of yoke 44 is not engaged by sear 45 but rather a clearance therebetween is provided to allow free swinging of sear 45 under the action of a bellows hereinafter described. A pull cable 52 is connected at one end to safety pin 51 and the other end has a snap hook 53 or equivalent affixed thereto for a purpose that will be explained in conjunction with the statement of operation below.

To enable the withdrawal of sear 45 from its position beneath the bight of yoke 44 in response to changes in atmospheric pressure, an evacuated bellows 55, at the free end thereof, is pin connected to sear 45. The other end of bellows 55 is closed by a cupped plate 56, there being a screw threaded boss 58 inwardly of the cup in plate 56. Through an end closure 59 an adjusting screw 62 protrudes into threaded engagement with boss 58. Concentric with boss 58 and reacting between spring seat 64 a closure plate 59 and the cup bottom of end plate 56 is compression spring 65 normally urging bellows 55 to the right as viewed in Figure 1. By the adjusting of screw 62 bellows 55 may be moved in either direction to effect the selection of an absolute pressure at which the sear is moved to release hammer 32. Since it is contemplated that bellows 55 is to be evacuated, a coiled compression spring 68 is employed interiorly of bellows 55 to prevent collapse thereof. To assure free communication between the atmosphere and the interior of receiver 13 about bellows 55, end closure plate 59 is provided with a plurality of vent openings 60.

In assembling the parachute release device, assuming the main housing 12, barrel 17 with spring 22, and receiver 13 containing the linkages and bellows 55 are separated, the following sequence of operations is followed:

(1) The hammer 32 and related locking levers are manually oriented into the respective positions shown in Figure 3;

(2) Safety pin 51 is thrust through aligned openings 47 and 49;

(3) A live cartridge 29 is placed in barrel 17 and the spring 22 and barrel 17 inserted in the receiver 13 to the position shown in Figure 1, finger opening 70 in receiver 13 being utilized for access to the inner end of leaf spring 22; and (4) Main housing 12 is then slid axially of the assembled parts to maintain them in such assembled relation. For preventing inadvertent disassembly a set screw 72 may be employed to interlock housing 12 and receiver 13.

Figure 6:
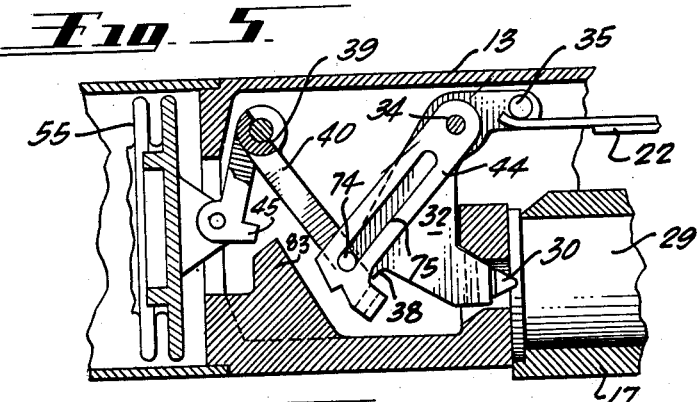
Figure 6 is a side sectional view similar to Figure 5 but showing the hammer and associated linkage in released position.

A second embodiment of this invention is shown in Figures 5 and 6 wherein a modified form of hammer control linkage and safety pin arrangement are employed. In this form of the invention, stirrup arms 40, 40 are positioned within the confines of yoke 44 and are movably interconnected therewith. This interconnection is accomplished by the provision of a pin 74 extending outwardly from stirrup arms 40, 40 with its extremities engaged in slots 75 formed in yoke 44. As will be apparent from a comparison of the construction of the two forms of the inventions, the mechanics of the respective hammer control linkages is identical, each interacting in the same manner and providing the same mechanical advantage in restraining the hammer 32 against the force of spring 22.

While this second form of the invention may have the same safety pin arrangement as incorporated in the first form (Figure 2), as here shown there is employed an elongated pin 78 adapted to pass through passages 79 and 80 respectively formed in a finger 82 protruding from yoke 44 and in a lug 83 affixed to casing 13. When the mechanism is in cocked position (Figure 5) passages 79 and 80 are in alignment. Pin 78 is then thrust internally through casing 13 and manipulated through the aligned openings 79, 80 whereby the hammer 32 will be retained in cocked condition regardless of the position of firing sear 45.

In the use of either form of the barometric and time delay parachute release of this invention, with the cartridge 29 positioned within barrel 17 and the hammer 32 in cocked position (Figures 4 and 5), the assembly is fixedly mounted with respect to a parachute. The free end of cable 52 is attached by hook 53 to the pilot seat and attaching member 27 is connected to the ripcord of the parachute in such a manner as to effect normal operation thereof when the rod 25 is thrust outwardly from cylinder 17. When the pilot is separated from the aircraft, as by ejection, safety pin 51 or 78 is immediately removed, thus placing the device in "ready" condition. During descent the bellows 55 will be progressively collapsed by the increasing air pressure until the preselected altitude is reached at which sear 45 is withdrawn from engagement with the bight of yoke 44. The hammer 32 and attached firing pin 30 will thereupon snap to the position shown in Figure 4 or 6 under the influence of leaf spring 22 to effect discharge of cartridge 29. After a lapse of a period of time, dependent on the internal construction of the time delay cartridge 29, pressurized gas will act against piston 24 resulting in outward motion of piston rod 25 thereby opening the parachute.

If the bailout altitude is below the preselected altitude the bellows 55 will of course already have been collapsed to an extent sufficient to have released yoke 44 from sear 45. Immediately then upon withdrawal of safety pin 51 or 78 the cartridge 29 will be struck by firing pin 30 and the parachute opened after lapse of the delay time of the cartridge. It will be appreciated that the delay is necessary to allow the pilot to clear the after portions of the aircraft and to decelerate but such delay is limited so the pilot will not descend any appreciable distance before opening of the parachute.

After actuation of the parachute release device it is readily reconditioned by inserting a fresh cartridge 29 and manually recocking the hammer 32 and repositioning the hammer control linkage to that shown in Figures 3 or 5.

While two preferred embodiments of this invention have been shown and described it is to be understood that it is susceptible to changes within the scope of the appended claims.

We claim:

1. In a parachute actuator utilizing pressurized fluid from an explosive type cartridge to operate movable means attached to a parachute ripcord: a hammer movable about a pivot axis and having a retaining finger and carrying a firing pin for striking the cartridge; biasing means normally urging the hammer in a direction toward the cartridge; a pivoted dog engageable with the retaining finger to maintain the hammer in a cocked position; elongate arms having ends attached to and movable with said dog; a yoke comprised of side portions and an interconnecting bight, said yoke embracing the hammer and being pivoted about the ends of the side portions remote from the bight on an axis coincident with the pivot axis of the hammer, the ends of the elongate arms being engageable with the side portions of the yoke whereby urging of the biasing means can be balanced by a substantially smaller force applied to the bight of the yoke; a sear for the yoke interacting therewith at the bight thereof; and pressure sensitive means controlling the sear by effecting movement thereof away from the bight of the yoke whereby to release the hammer.

2. In a parachute actuator utilizing pressurized fluid from an explosive type cartridge to operate movable means attached to a parachute ripcord: a hammer movable about a pivot axis and having a retaining finger and carrying a firing pin for striking the cartridge; biasing means normally urging the hammer in a direction toward the cartridge; a pivoted dog engageable with the retaining finger to maintain the hammer in a cocked position; elongate arm means having ends and being attached to and movable with said dog; a yoke comprised of side portions and an interconnecting bight, said yoke embracing the hammer and being pivoted about the ends of the side portions remote from the bight on an axis coincident with the pivot axis of the hammer, the ends of the elongate arms being engageable with the side portions of the yoke whereby urging of the biasing means can be balanced by a substantially smaller force applied to the bight of the yoke; a sear for the yoke interacting therewith at the bight thereof; pressure sensitive means controlling the sear by effecting movement thereof away from the bight of the yoke whereby to release the hammer; and pin means insertable through aligned openings in the hammer and yoke to maintain the hammer in cocked condition to override the control of the pressure sensitive means.

3. In a parachute actuator utilizing pressurized fluid from an explosive type cartridge to operate movable means attached to a parachute ripcord: a hammer movable about a pivot axis and having a retaining finger and carrying a firing pin for striking the cartridge; a pivoted dog engageable with the retaining finger to maintain the hammer in a cocked position; elongate arms having ends attached to and movable with said dog; a yoke comprised of side portions and an interconnecting bight, said yoke embracing the hammer and being pivoted about the ends of the side portions remote from the bight on an axis coincident with the pivot axis of the hammer, the ends of the elongate arms being engageable with the side portions of the yoke, a sear for the yoke interacting therewith at the bight thereof; pressure sensitive means controlling the sear by effecting movement thereof away from the bight of the yoke whereby to release the hammer; a chassis supporting the hammer and having a depression therein; a piston and cylinder removably mounted in the depression and carrying a cartridge to receive a percussive blow from the hammer; a casing embracing the chassis and retaining the piston and cylinder in the depression; and biasing means on the casing urging the hammer toward the cartridge.

4. A parachute actuator of the type defined comprising: a chassis having means therein to removably receive an elongate piston and cylinder; a piston and cylinder positioned in said means, said cylinder being adapted to receive a cartridge in one end thereof to supply pressurized gas to the piston to urge the piston to the other end of the piston; hammer means on the chassis adjacent the said one end of the cylinder for applying a percussive blow to the cartridge; means to maintain the hammer in a cocked condition; a generally cylindrical casing encompassing said chassis and maintaining the piston and cylinder in the chassis; biasing means affixed to said casing and being insertable into the chassis along a line generally paralleling the cylinder and into engagement with the hammer means to normally urge the hammer means toward the cartridge; and pressure sensitive means for releasing the hammer means.

5. A parachute actuator as defined in claim 4 wherein an access opening is provided in the chassis for manipulation of the biasing means into engagement with the hammer means, the casing closing said access opening when said casing encompasses the chassis.

6. A parachute actuator comprising: an elongated tubular chassis; an outwardly opening trough in the chassis extending longitudinally along a partial length of the chassis, one end of the trough being adjacent one end of the chassis; a unit including a piston and cylinder removably nested in said trough; means interengaging the trough and the cylinder unit precluding relative longitudinal movement therebetween; a percussive type cartridge in the end of the cylinder for supplying a pressurized fluid against the piston to move it outwardly toward said one end of the chassis; a casing encompassing the chassis and maintaining the unit within the trough; pressure sensitive means in and adjacent the other end of the chassis; hammer means and holding means retaining the hammer in a cocked position in said chassis between the trough and the pressure sensitive means, said hammer being movable against the cartridge to effect discharge thereof; and means acting between the holding means and the pressure sensitive means to release the hammer when the pressure sensitive means is subjected to a predetermined pressure.

7. A parachute actuator comprising: an elongated tubular chassis; an outwardly opening trough in the chassis extending longitudinally along a partial length of the chassis, one end of the trough being adjacent one end of the chassis; a unit including a piston and cylinder removably nested in said trough; means interengaging the trough and the cylinder unit precluding relative longitudinal movement therebetween; a percussive type cartridge in the end of the cylinder for supplying a pressurized fluid against the piston to move it outwardly toward said one end of the chassis; a casing encompassing the chassis and maintaining the unit within the trough; pressure sensitive means in and adjacent the other end of the chassis; hammer means and holding means retaining the hammer in a cocked position on said chassis between the trough and the pressure sensitive means, said hammer being movable against the cartridge to effect discharge thereof; a cantilever leaf spring in said chassis adjacent and generally parallel to the trough, said leaf spring biasing the hammer means toward the cartridge; and means acting between the holding means and the pressure sensitive means to release the hammer when the pressure sensitive means is subjected to a predetermined pressure.

8. A parachute actuator comprising: an elongated tubular chassis; an outwardly opening trough in the chassis extending longitudinally along a partial length of the chassis, one end of the trough being adjacent one end of the chassis; a unit including a piston and a cylinder nested in said trough; means interengaging the trough and the cylinder unit precluding relative longitudinal movement therebetween; a percussive type cartridge in the end of the cylinder for supplying a pressurized fluid against the piston to move it outwardly toward said one end of the chassis; a casing encompassing the chassis and maintaining the unit within the trough; pressure sensitive means in and adjacent the other end of the chassis; hammer means and holding means retaining the hammer in a cocked position on said chassis between the trough and the pressure sensitive means, said hammer being movable against the cartridge to effect discharge thereof; elongated spring means insertable into the chassis in parallelism with the trough and into biasing contact with the hammer means to effect movement thereof toward the cartridge, said chassis being provided with an access opening proximate the hammer for manipulation of the spring into biasing contact with the hammer means; and means acting between the holding means and the pressure sensitive means to release the hammer when the pressure sensitive means is subjected to a predetermined pressure.

9. A parachute actuator comprising: an elongated tubular chassis; an outwardly opening trough in the chassis extending longitudinally along a partial length of the chassis, one end of the trough being adjacent one end of the chassis; a unit including a piston and cylinder removably nested in said trough; means interengaging the trough and the cylinder unit precluding relative longitudinal movement therebetween; a percussive type cartridge in the end of the cylinder for supplying a pressurized fluid against the piston to move it outwardly toward said one end of the chassis; a casing slidable onto said chassis into close encompassing relation with the chassis to close the trough and maintain the unit therewithin; pressure sensitive means in and adjacent the other end of the chassis; hammer means and holding means retaining the hammer in a cocked position on said chassis between the trough and the pressure sensitive means, said hammer being movable against the cartridge to effect discharge thereof; a cantilever leaf spring in said chassis adjacent and generally parallel to the trough, said leaf spring biasing the hammer means toward the cartridge; and means acting between the holding means and the pressure sensitive means to release the hammer when the pressure sensitive means is subjected to a predetermined pressure.

References Cited in the file of this patent

UNITED STATES PATENTS

| 1,815,226 | Anderson | July 21, 1931 |
| 2,387,350 | Quilter | Oct. 23, 1945 |
| 2,421,762 | Short | June 10, 1947 |
| 2,505,869 | Quilter | May 2, 1950 |

FOREIGN PATENTS

| 129,017 | Great Britain | July 10, 1919 |
| 580,592 | Great Britain | Sept. 12, 1946 |
| 615,054 | Great Britain | Dec. 31, 1948 |